(12) United States Patent  
Iwamura

(10) Patent No.: US 7,574,604 B2  
(45) Date of Patent: *Aug. 11, 2009

(54) NETWORK DEVICE REGISTRATION

(75) Inventor: Ryuichi Iwamura, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 815 days.

This patent is subject to a terminal disclaimer.

(21) Appl. No.: 11/133,961

(22) Filed: May 20, 2005

(65) Prior Publication Data

US 2005/0210295 A1   Sep. 22, 2005

Related U.S. Application Data

(63) Continuation-in-part of application No. 10/379,626, filed on Mar. 4, 2003, now abandoned.

(51) Int. Cl.  
*H04L 9/00* (2006.01)

(52) U.S. Cl. .................. 713/171; 713/176; 713/179; 713/180; 713/186; 726/13; 380/255

(58) Field of Classification Search ............ 713/171, 713/176, 179, 180, 186; 380/255; 726/13  
See application file for complete search history.

(56) References Cited

U.S. PATENT DOCUMENTS

| | | | | |
|---|---|---|---|---|
| 5,073,931 A * | 12/1991 | Audebert et al. | ............ | 380/251 |
| 6,088,800 A * | 7/2000 | Jones et al. | ............ | 713/189 |
| 6,198,824 B1 * | 3/2001 | Shambroom | ............ | 380/279 |
| 6,230,269 B1 * | 5/2001 | Spies et al. | ............ | 713/182 |
| 6,807,226 B1 * | 10/2004 | Suetsugu et al. | ............ | 375/224 |
| 6,874,084 B1 | 3/2005 | Dobner et al. | | |
| 6,968,059 B1 * | 11/2005 | Kimura | ............ | 380/201 |
| 7,155,681 B2 * | 12/2006 | Mansour et al. | ............ | 715/762 |
| 2002/0147820 A1 * | 10/2002 | Yokote | ............ | 709/229 |
| 2003/0208595 A1 * | 11/2003 | Gouge et al. | ............ | 709/225 |
| 2004/0039924 A1 * | 2/2004 | Baldwin et al. | ............ | 713/189 |
| 2004/0236965 A1 * | 11/2004 | Krohn | ............ | 713/201 |
| 2005/0076210 A1 * | 4/2005 | Thomas et al. | ............ | 713/165 |
| 2005/0154873 A1 * | 7/2005 | Cam-Winget et al. | ............ | 713/150 |
| 2005/0273609 A1 * | 12/2005 | Eronen | ............ | 713/171 |

OTHER PUBLICATIONS

Kaarle Ritvanen & Kaisa Nyberg; "Upgrade of Bluetooth Encryption and Key Replay Attack"; Helsinki University of Technology & Nokia Corporation Nov. 5, 2004; pp. 1-13.*  
Stallings, William, "Data and Computer Communications", 5th Ed., 1997, pp. 21-22 and 522-525.  
Menezes, Alfred J. "Handbook of Applied Cryptography," 1997, pp. 363, 546-547.

* cited by examiner

*Primary Examiner*—Carl Colin  
(74) *Attorney, Agent, or Firm*—Blakely, Sokoloff, Taylor & Zafman LLP

(57) ABSTRACT

An embodiment of the present invention includes a technique to register a client to a server for communication. A remote commander transmits an identification code to the server and the client. The server has a key. The client is coupled to the server via a network. The server encrypts the key with the identification code and sends the encrypted key to the client. The client decrypts the encrypted key using the identification code. The server and the client then exchanges information encrypted by the key.

23 Claims, 3 Drawing Sheets

NETWORK DEVICE REGISTRATION

RELATED APPLICATION

This application is a continuation-in-part application of the application filed on Mar. 4, 2003, now abandoned titled "Network Audio Systems", Ser. No. 10/379,626, assigned to the same assignee of this application.

BACKGROUND

1. Field of the Invention

Embodiments of the invention relates to the field of audio/video network systems, and more specifically, to device registration.

2. Description of Related Art

Network audio/video systems provide a versatile and efficient way for home entertainment. A typical network audio/video system includes an audio/video server connected to a network to communicate with a number of clients. The audio/video server usually has a hard disk drive (HDD) that can store audio/video data (e.g., music, movies) on hundreds of compact disks (CD's) or digital versatile disks (DVD's). The audio server may also have a large CD database that contains information on CD's such as identifiers, titles, authors, content lists, etc. Client devices such as boom boxes, computers, audio/video players, can download audio/video data and information through network connectivity.

A registration procedure is typically needed to allow the audio/video server and a client device to obtain identification information for communication. Existing techniques for registration have a number of drawbacks. In a first method, command buttons are entered on both the server and the client and the two exchange information over the network. This technique is simple but unsecured. An adversary may intercept the communication and compromise the security. In a second method, an identification (ID) card containing the ID information of the client is installed in the server. This method is costly, requiring the ID card and a slot interface in the server. In a third method, the server and the client are connected with an interface cable such as Universal Serial Bus (USB). This method is costly and inconvenient because it requires both the server and the client to have dedicated USB interface. In the last method, a remote commander having a client ID is used to send the client ID to the server. The problem with this method is the difficulty to pair the remote unit with the client because the same ID number must be programmed in both of the remote unit and the client. There is also a chance for erroneous pairing.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention includes a technique to register a client to a server for communication. A remote commander transmits an identification code to the server and the client. The server has a key. The client is coupled to the server via a network. The server encrypts the key with the identification code and sends the encrypted key to the client. The client decrypts the encrypted key using the identification code. The server and the client then exchanges information encrypted by the key.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention provide an efficient technique to provide secure device registration with a server in a home or small office environment. A remote commander sends an identification code to the server and to the client. The server encrypts a network key with the identification code and sends the encrypted key to the client. The client decrypts the encrypted key using the identification code to obtain the key. After the key is obtained, the server and the client can exchange information encrypted/decrypted by the key. The identification code is used temporarily to encrypt the key during the transmission of the key from the server to the client. Thereafter, the identification code is not needed. Therefore, even if an adversary obtains the identification code after the registration is completed, it is not much use. The system security is enhanced. Interceptors are not able to decipher messages exchanged between the server and the client because they do not have the network key.

Figure 1:
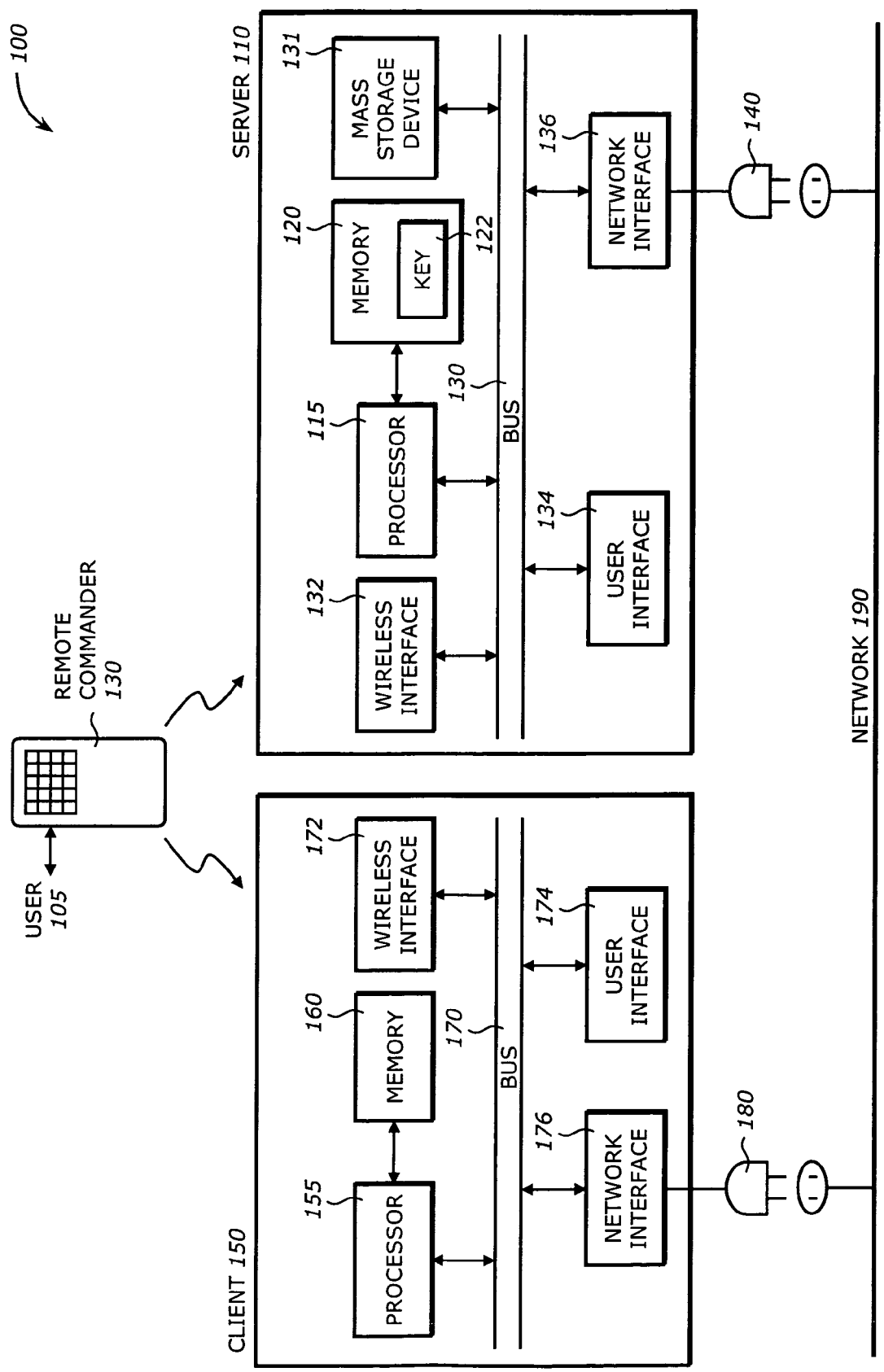
FIG. 1 is a diagram illustrating a system in which one embodiment of the invention can be practiced.

FIG. 1 is a diagram illustrating a system 100 in which one embodiment of the invention can be practiced. The system 100 includes a remote commander 130, a server 110, a client 150, and a network 190. Note that the system 100 may include more or less elements than these elements.

The remote commander 130 is a remote unit used by a user 105 to remotely control the server 110 and the client 150. The remote commander 130 may have entry devices such as buttons or keypad to allow the user 105 to enter commands or to select an operation. The remote commander 130 may also have a display. The user 105 may select or enter a command to the remote commander 130 to perform operations such as enabling a device registration mode, select a format to send an identification (ID) code to the server 110 and the client 150, audio and/or video operations (e.g., play, pause, stop, fast review, fast forward). The remote commander 130 has a built-in wireless interface or transmitter to transmit the ID code in a wireless connectivity such as optical (e.g., infra-red), sonic (e.g., ultrasound), and electromagnetic (e.g., Bluetooth).

The server 110 may be an audio and/or video server. It may be configured to store audio/video data recorded from a large number of audio or video media such as compact disks (CDs) or digital versatile disks (DVDs). An example of the server 110 is the Sony DMT-PR1 Bitplay audio/video system manufactured by Sony Corporation. The server 110 includes a processor 115, a memory 120, a bus 130, a mass storage device 131, a wireless interface 132, a user interface 134, and a network interface 136.

The processor 115 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The memory 120 stores program code and data. The memory 120 is typically implemented with dynamic random access memory (DRAM) or static random access memory (SRAM). It may also include non-volatile memory such as flash memory. The memory 120 stores a key 122 for cryptographic communication. The key 122 is used by the server to encrypt messages or information to be sent out and to decrypt messages or information encrypted by the key 122.

The bus 130 provides interface signals to allow the processor 115 to communicate with other processors or devices such as the wireless interface 132, the user interface 134, and the network interface 136.

The mass storage device 131 stores archive information such as code, programs, files, data, applications, and operating systems. The mass storage device 131 may include a compact disk (CD) ROM, a digital video/versatile disc (DVD), a floppy drive, and a hard drive, and any other magnetic or optic storage devices. The data may include audio and/or video data such as music, movies, graphics, animation, etc. The mass storage device 131 provides a mechanism to read machine-accessible media. The machine-accessible media may contain computer readable program code to perform tasks as described in the following.

The wireless interface 132 includes a wireless receiver to receive wireless messages sent from the remote commander 130. The wireless receiver may be an optical (e.g., infra-red) receiver, a sonic (e.g., ultrasound) receiver, or an electromagnetic (e.g., Bluetooth) receiver. The user interface 134 provides interface to user for command entry and/or display. The user may enter commands via a keypad or buttons. The display may provide feedback information to the user.

The network interface 136 provides interface to the network 190. In one embodiment, the network 190 is a power line and the network interface 136 is a power line communication (PLC) interface. The PLC technology allow convenient, flexible, and cost-effective access to the server 110 from various clients, such as the client 150, connected to the server 110 via power lines. In addition, the use of PLC technology enhances the mobility of the clients as they can be easily moved from one physical location to another physical location without disrupting the network configuration and the accessibility to the server 110. PLC may be deployed in accordance with the "HomePlug 1.0 Specification," dated Jun. 30, 2001. The server 110 may send and receive information to and from the client 150 through the power line. The network or power plug 140 is plugged into the socket connecting to the network or power line 190 to allow the information to be transmitted over the network or power line 190 from and to the PLC interface 136. It is noted that any network technology other than the PLC may be employed. This may include wireless or wired networks.

The client 150 is a client device that communicates with the server 110 via the power line 190. Typically in a home or small office environment, there may be multiple clients connecting to the server 110. For clarity, only one client 150 is shown. The client 150 may be an audio and/or video player (e.g., boom box). The client 150 has similar components like the server 150, but with smaller, slower, or less power consumption components. The client 150 includes a processor 155, a memory 160, a bus 170, a wireless interface 172, a user interface 174, and a network interface 176.

The processor 155 may be any processor similar to the processor 115. In one embodiment, the processor 155 is slower and consumes less power than the processor 115. Similarly, the memory 160 is similar to the memory 120. Initially, the memory 160 does not contain the key 122. The bus 170 allows the processor 155 to interface to a number of devices. The wireless interface 172 allows the client 150 to receive messages transmitted in a wireless connectivity from the remote commander 130. The wireless interface 172 may be similar to the wireless interface 132. It may include one of an optical (e.g., infrared) receiver, a sonic (e.g., ultrasound) receiver, or an electromagnetic (e.g., Bluetooth) receiver. The user interface 174 provides interface to the user 105 including an entry device (e.g., keypad, button) and/or display. The network interface 176 is connected to the network or power plug 180 to allow communication between the server 110 and the client 150 to occur over the network or power line 190.

Figure 2:
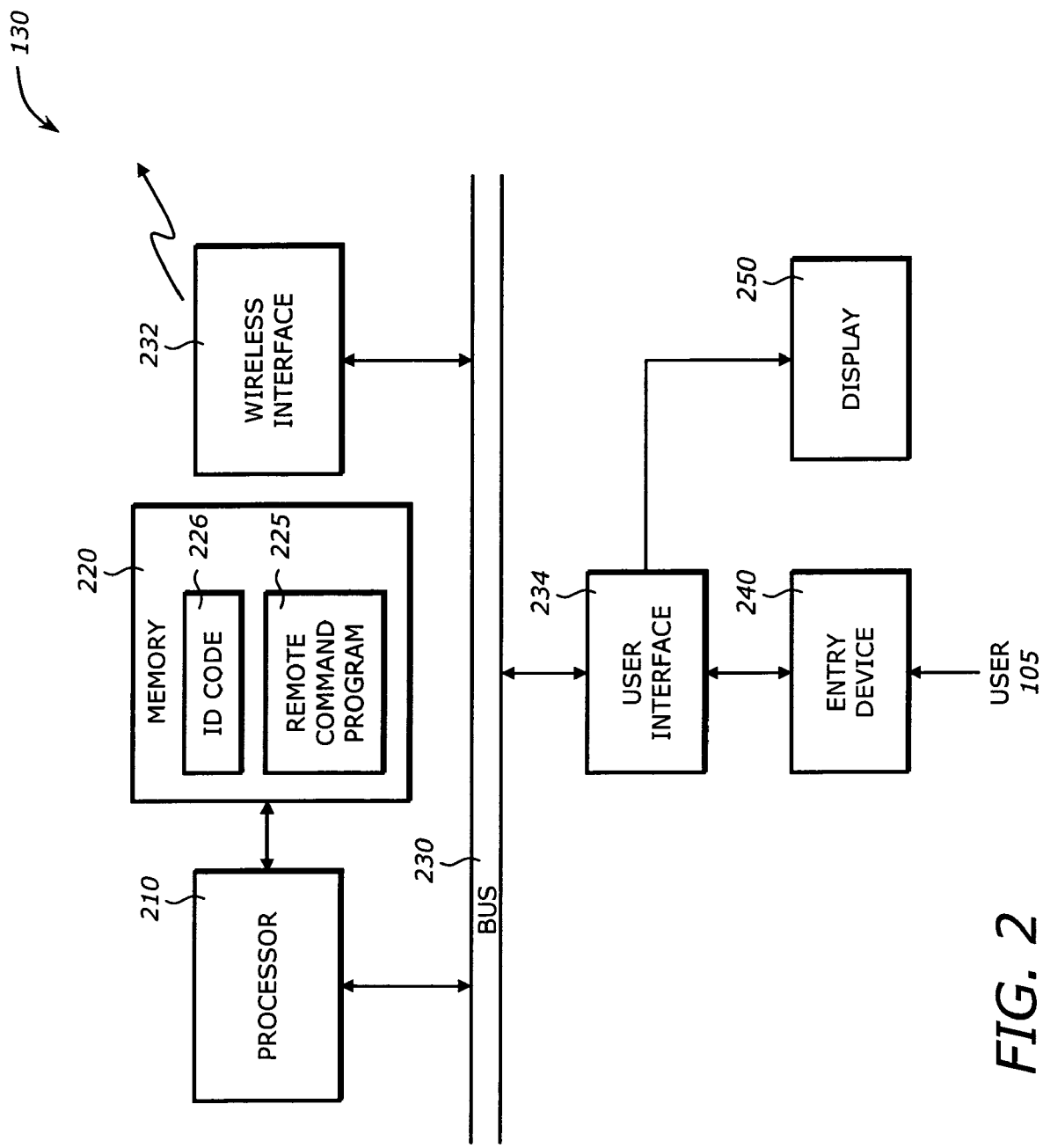
FIG. 2 is a diagram illustrating a remote commander according to one embodiment of the invention.

FIG. 2 is a diagram illustrating a remote commander 130 according to one embodiment of the invention. The remote commander 130 includes a processor 210, a memory 220, a bus 230, a wireless interface 232, and a user interface 234.

The processor 210 is any suitable processor that can execute a program. Typically, the processor 210 is a microcontroller, a digital signal processor, or a mobile processor. The memory 220 is coupled to the processor 210 to store instructions and/or data. The memory 220 may be a DRAM or a SRAM. It may also include non-volatile memory such as flash memory. The memory 220 includes a remote command program 225 and an identification (ID) code 226.

The bus 230 allows the processor 210 to interface to a number of devices such as the wireless interface 232 and the user interface 234. The wireless interface 232 is coupled to the processor 210 to transmit the identification code 226 to the server 110 and the client 150. The user interface 234 is coupled to the processor via the bus 230 to send a user command entered by the user 105 to the processor 210.

The remote command program 225 includes instructions that, when executed by the processor 210, causes the processor 210 to send the identification code 226 to the wireless interface 232 when the processor 210 receives the user command. The remote command program 225 also contains instructions to encode the identification code 226 with an error checking code such as cyclic redundancy check or code (CRC), to obtain the identification code 226 being a preset value stored in a storage location, or to randomly generate the identification code 226 when the processor 210 receives the user command. The identification code 226 may be preset at the factory or randomly generated each time the user 105 enters a command. The command to randomly generate the identification code 226 may be a command to enable the registration mode. The identification code 226 may be of any desired length. Typically, the identification code 226 may be 10 digits or ranging from 48 bits to 64 bits.

The command or commands used for device registration including the command to send the identification code 226 by the remote commander 130 may be vendor specific. The server 110 may need to know the format of the command or the identification code 226. If the server 110 and the remote commander 130 are manufactured by the same manufacturer, then the format can be known. When the remote commander 130 is made by a manufacturer different than the server manufacturer, then there are a number of methods to allow the server 110 to interpret or decode the command format.

In the first method, the format may be standardized to be compatible with a number of manufacturers. A consortium of manufacturers may agree upon the specifications to define the command format that is used for device registration. Other commands for routine operations like Play, Stop, Fast Forward, etc. may not need to be standardized.

In the second method, the server 110 may be programmed to interpret the format based on the information provided by the manufacturer of the remote commander 130. A number of formats from a number of manufacturers may be supported. The remote commander 130 then may have a selection menu to allow the user to select a manufacturer format. For example, the user 105 may use a remote commander made by Panasonic and select the format for Sony. The ID code is then sent to the server 110 made by Sony using Sony infrared format. Alternatively, the selection may be made at the server 110 through the user interface at the server 110. Selecting a manufacturer is much more convenient than entering a long string of ID code.

In the third method, the remote commander 130 transmits the ID code 226 in all vendors' formats, one after another. Each ID code is associated with a CRC. The server 110 receives a number of ID codes and determines the CRC. If the CRC passes, it indicates that the format is the proper format, i.e., the format of the manufacturer that the server 110 is designed to interpret. Then, the server 110 obtains the decoded ID code. The server 110 simply discards all other codes that fail the CRC check.

Figure 3:
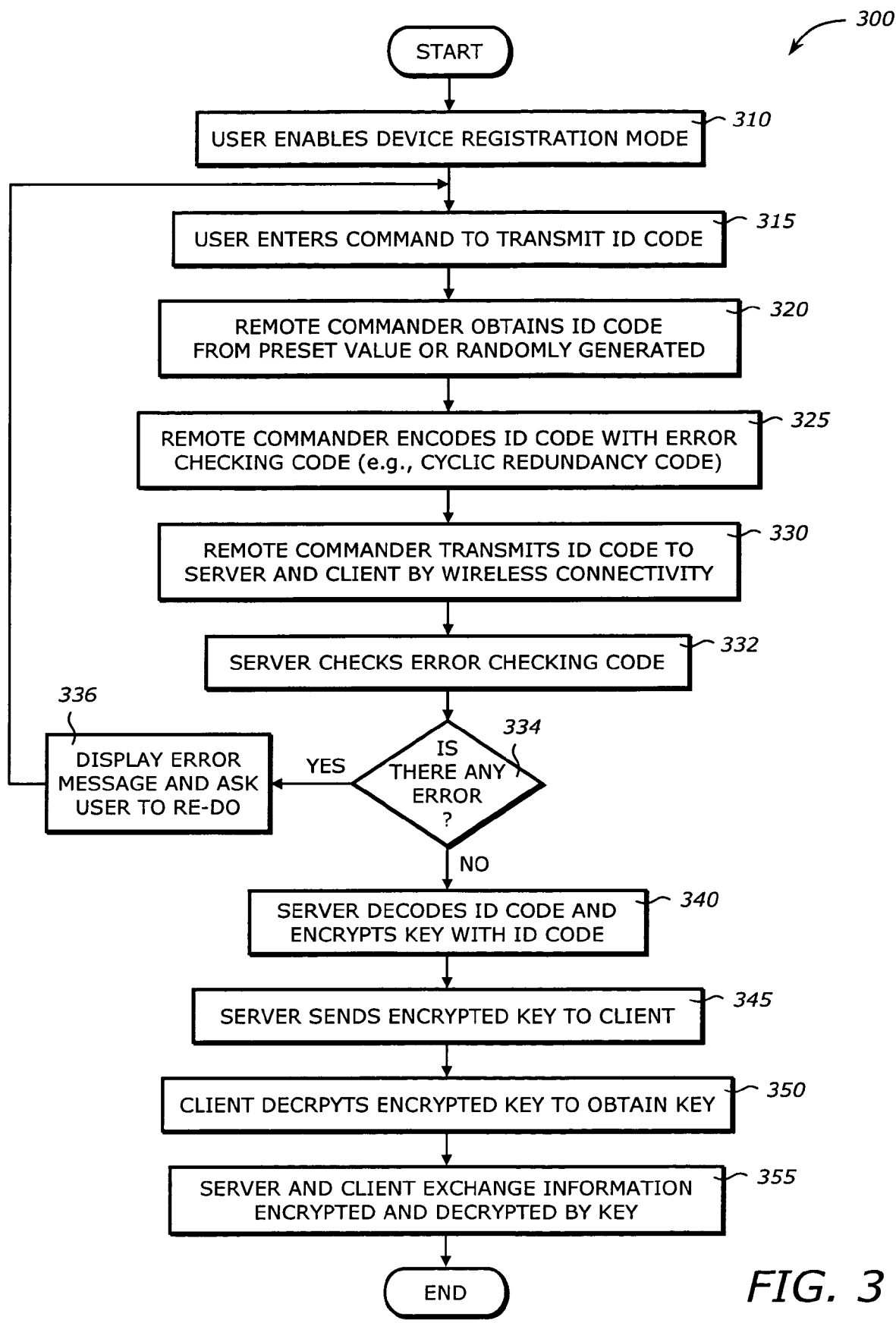
FIG. 3 is a flowchart illustrating a process to perform device registration according to one embodiment of the invention.

FIG. 3 is a flowchart illustrating a process 300 to perform device registration according to one embodiment of the invention.

Upon START, the user enables the device registration mode (Block 310). This may be performed by pressing a button on the remote commander or selecting an item on a selection menu. Next, the user enters a command to transmit the ID code (Block 315). The user may point the remote commander to the server and press the transmit button. Then the user points the remote commander to the client and press the transmit button. Then, the remote commander obtains the ID code (Block 320). The ID code may be available as a preset value stored in a storage location, or randomly generated by the processor in the remote commander.

Next, the remote commander encodes the ID code with an error checking/correcting code such as the cyclic redundancy code (Block 325). This operation may be optional. Then, the remote commander transmits the ID code to the server and/or the client by a wireless connectivity (Block 330). The wireless connectivity may be optical (e.g., infra-red), sonic (e.g., ultrasound), or electromagnetic (e.g., Bluetooth).

Then, the server checks the error checking code (Block 332). Next, the server determines if there is any error from the error checking (Block 334). If so, the server displays or transmits an error message and asks the user to re-do or to re-enter the command (Block 336) and the process 300 returns to Block 315. If there is no error, the server proceeds with decoding the ID code according to the format and encrypts the network key using the ID code (Block 340). Any suitable encryption algorithm may be used. In one embodiment, the system supports symmetric key cryptography such as cryptography in accordance with Data Encryption Standard (DES). Then, the server sends the encrypted key to the client (Block 345). This can be done through the network or power line connectivity. Next, the client decrypts the encrypted key to obtain the network key (Block 350). Since the client receives the same ID code as the server, it can decrypt the encrypted key using the same ID code.

After the client obtains the network key, the server and the client exchange information encrypted and decrypted using the network key (Block 355). The information may include any messages, download information, audio and/or video data information (e.g., title, song), etc. The encryption and decryption techniques of the messages exchanged between the server and the client may be the same or different than the cryptography technique used by the server to send the key to the client.

Elements of one embodiment of the invention may be implemented by hardware, firmware, software or any combination thereof. The term hardware generally refers to an element having a physical structure such as electronic, electromagnetic, optical, electrooptical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   transmitting an identification code, encoded with an error checking code and obtained when a device registration mode is enabled, to a server and a client using a remote commander upon receiving a command from a user, the server being one of an audio server and a video sewer and having a key, the client being one of an audio player device and a video player device and being coupled to the sewer via a network;
   encrypting the key with the identification code by the sewer;
   sending the encrypted key from the server to the client;
   decrypting the encrypted key by the client using the identification code; and
   exchanging information between the server and the client, the information being encrypted by the key.

2. The method of claim 1 wherein transmitting comprises:
   enabling the device registration mode; and
   transmitting the identification code using a wireless connectivity.

3. The method of claim 2 wherein
   the identification code is one of a preset value and a randomly generated value.

4. The method of claim 2 wherein transmitting the identification code comprises:
   transmitting the identification code using one of an optical transmitter, a sonic transmitter, and an electromagnetic transmitter.

5. The method of claim 1 wherein
   the error checking code is a cyclic redundancy check (CRC) code.

6. The method of claim 5 further comprising:
   decoding the identification code using the error checking code.

7. An apparatus comprising:
   a processor;
   a memory coupled to the processor to store instructions;
   a user interface coupled to the processor to send a user command entered by a user to the processor;
   a wireless interface coupled to the processor to transmit, to a server and a client, an identification code used to encrypt a key sent from the server to the client, the key being used to encrypt information exchanged between the server and the client, the server being one of an audio server and a video server and the client being one of an audio player device and a video player device, the identification code being encoded with an error checking code and obtained when a device registration mode is enabled;
   wherein the instructions, when executed by the processor, causes the processor to send the identification code to the server and the client via the wireless interface when the processor receives the user command.

8. The apparatus of claim 7 wherein the error checking code is a cyclic redundancy check (CRC) code.

9. The apparatus of claim 7 wherein the instructions further causes the processor to obtain the identification code being a preset value stored in a storage location.

10. The apparatus of claim 7 wherein the instructions further causes the processor to randomly generate the identification code when the processor receives the user command.

11. The apparatus of claim 7 wherein the instructions causing the processor to send the identification code comprises instructions, when executed by the processor, that causes the processor to send the identification code in a format.

12. The apparatus of claim 11 wherein the format is a standardized format.

13. The apparatus of claim 11 wherein the format is selected by the user via the user interface.

14. The apparatus of claim 7 wherein the wireless interface comprises one of an optical transmitter, a sonic transmitter, and an electromagnetic transmitter.

15. A system comprising:
    a server being one of an audio server and a video server and having a key;
    a client being one of an audio player device and a video player device and coupled to the server via a network; and
    a remote commander to transmit an identification code to the server and the client in a wireless connectivity upon receiving a command from a user, the identification code being encoded with an error checking code and obtained when a device registration mode is enabled;
    wherein the server, upon receiving the identification code, encrypts the key with the identification code and sends the encrypted key to the client, and the client decrypts the encrypted key using the identification code, the key being used to encrypt and decrypt information exchanged between the server and the client.

16. The system of claim 15 wherein the error checking code is a cyclic redundancy check (CRC) code.

17. The system of claim 16 wherein at least one of the server and the client decodes the identification code using the error checking code.

18. The system of claim 15 wherein the wireless connectivity is one of an optical connectivity, a sonic connectivity, and an electromagnetic connectivity.

19. The system of claim 15 wherein the remote commander transmits the identification in a format interpreted by the server.

20. The system of claim 19 wherein the format is a standardized format.

21. The system of claim 19 wherein the format is selected by the user.

22. The system of claim 15 wherein the server is configured to store audio/video data recorded from media.

23. The system of claim 15 wherein the client communicates with the server via a power line.

* * * * *